July 7, 1953

G. CHIAPELLA 2,644,714

PLATFORM FOR CONNECTING THE CONTIGUOUS
SECTIONS OF ARTICULATED VEHICLES

Filed April 11, 1951

Patented July 7, 1953

2,644,714

UNITED STATES PATENT OFFICE 2,644,714

PLATFORM FOR CONNECTING THE CONTIGUOUS SECTIONS OF ARTICULATED VEHICLES

Giuseppe Chiapella, Turin, Italy, assignor to Officine Viberti Societa per Azioni, Turin, Italy Application April 11, 1951, Serial No. 220,415
In Italy April 24, 1950

5 Claims. (Cl. 296—1)

1

This invention relates to wheeled vehicles comprising at least two sections hinged together and is more particularly concerned with a control device for the platform, which establishes continuity of the floor of the vehicle body.

An object of this invention is to provide a control device for the platform, chiefly consisting of a cable or other flexible member secured to and wound on two segments, fixedly connected with the frame of a section of the articulated wheeled vehicle and to the platform, respectively, the latter segment being of larger radius. A further object of this invention is to provide, in brackets projecting from the sides of the vehicle section not provided with a sector, idle guide rollers about which the platform control cable extends.

On angular displacement of one vehicle section relative to the other, the platform is caused to assume an angular position intermediate between the two sections.

The invention shall be described in detail with reference to the accompanying drawing which shows diagrammatically by way of example an embodiment thereof.

Figure 1:
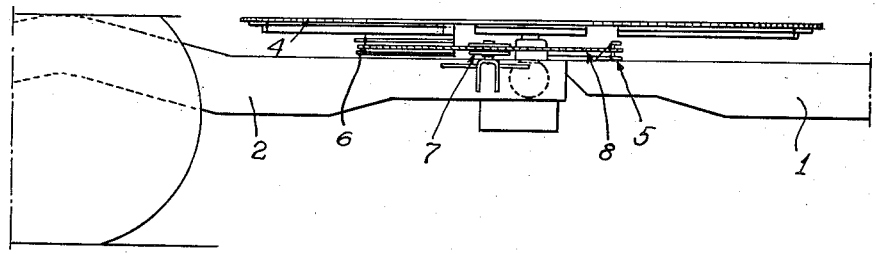
Figure 2:
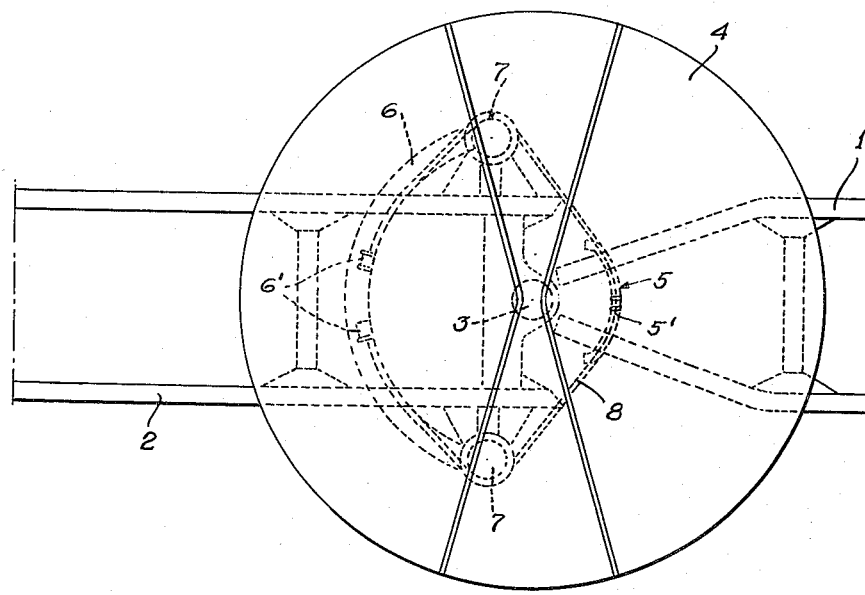

Figure 1 is a side view of the device;
Figure 2 is a plan view.

1 and 2 denote the adjacent ends of the two contiguous sections of the wheeled vehicle, connected together by means of the spherical joint 3. 4 denotes a platform of which the center is situated on the axis of articulation of the wheeled vehicle sections 1 and 2. The section 1 has fixedly attached thereto a circular grooved segment 5 receiving and having secured thereto at 5' a cable 8 which travels over two idle rollers 7 carried by brackets projecting from the sides of section 2. The ends of the cable 8 are anchored at 6' to a further circular grooved segment 6 attached to the platform 4 and of which the radius is twice that of the segment 5.

As the wheeled vehicle drives over a curve, the radius of the segment 6 being twice that of the segment 5, the platform 4 performs a rotation proportional to the ratio between the radii of the two sectors 5, 6, respectively, that is, it rotates through an angle half the angle of rotation of the section 1 with respect to the longitudinal axis of the section 2.

It will be understood that, without departing from the scope of this invention, the constructional form and details may be varied to suit requirements.

What I claim is:

1. In an articulated wheeled vehicle compris-

2 ing two sections and a hinge for articulately connecting said sections, a platform member rotatably mounted about the axis of said hinge, an arcuate sector on said platform, an arcuate sector on one of said sections, and flexible means wound on said sectors and secured to one of said sectors, whereby on relative angular displacement of the two sections said platform undergoes an angular displacement proportional to the ratio between the radii of curvature of said arcuate sectors.

2. In an articulated wheeled vehicle comprising two sections and a spherical pivot for connecting said sections, a platform rotatably mounted about the vertical axis of said spherical pivot, a first circular sector secured to one of said sections, a second circular sector secured to said platform and having a greater radius than the first-mentioned sector, and flexible means secured to and wound on said sectors, whereby on angular displacement of one section relative to the other section, the platform undergoes rotation through an angle proportional to the ratio between the radii of said sectors.

3. In an articulated wheeled vehicle comprising two sections and a spherical pivot for connecting said sections, a platform rotatably mounted about the vertical axis of said spherical pivot, a first circular sector secured to one of said sections, a second circular sector secured to said platform and having a radius twice that of the first-mentioned circular sector, and flexible means anchored to and wound on said sectors, whereby on angular displacement of one section relative to the other section the platform undergoes rotation through an angle equalling one-half the angular displacement of said sections.

4. An articulated wheeled vehicle comprising two sections, a spherical pivot for connecting two sections, a platform rotatably mounted about the vertical axis of said pivot, a first circular sector secured to one of said sections, a second circular sector secured to said platform and having a greater radius than the first-mentioned sector, guide rollers mounted on the sides of the other section, and flexible means extending about said rollers and anchored to and wound on said circular sectors, whereby on angular displacement of one section relative to the other the platform undergoes rotation through an angle proportional to the ratio between the radii of said sectors.

5. An articulated wheeled vehicle comprising two sections, a spherical pivot for connecting said sections, a platform rotatably mounted about the vertical axis of said pivot, a first circular sector secured to one of said sections, a second circular sector secured to said platform, and having a radius twice that of the first-mentioned circular sector, guide rollers mounted on the sides of the other section, and flexible means extending about said guide rollers and winding on and anchored to said circular sectors, whereby on angular displacement of one section relative to the other the platform undergoes rotation through an angle equalling one-half the angular displacement of said sections.

GIUSEPPE CHIAPELLA.

References Cited in the file of this patent

UNITED STATES PATENTS

| Number | Name | Date |
|---|---|---|
| 1,581,688 | Pehrson | Apr. 20, 1926 |
| 1,706,364 | Pehrson | Mar. 19, 1929 |
| 1,851,702 | Griffin | Mar. 29, 1932 |
| 2,171,846 | Davidson | Sept. 5, 1939 |
| 2,433,269 | Fellabaum | Dec. 23, 1947 |